United States Patent

Zomotor et al.

Patent Number: 5,471,388
Date of Patent: Nov. 28, 1995

[54] METHOD AND APPARATUS FOR PREVENTING VEHICLE HANDLING INSTABILITIES

[75] Inventors: Adam Zomotor, Waiblingen; Walter Klinkner, Stuttgart; Erich Schindler, Unterweissach; Frank-Werner Mohn, Esslingen; Thomas Wohland, Stuttgart, all of Germany

[73] Assignee: Mercedes-Benz AG, Germany

[21] Appl. No.: 912,371

[22] Filed: Jul. 13, 1992

[30] Foreign Application Priority Data

Jul. 13, 1991 [DE] Germany ............... 41 23 232.1

[51] Int. Cl.$^6$ .................. B62D 5/00; B62D 6/00
[52] U.S. Cl. ............... 364/424.05; 180/140; 180/79.1
[58] Field of Search ............... 364/424.05, 426.01, 364/426.02, 426.03; 180/197, 140, 141, 142, 79.1; 280/91

[56] References Cited

U.S. PATENT DOCUMENTS

| | | | |
|---|---|---|---|
| 4,998,593 | 3/1991 | Karnopp et al. | 180/140 |
| 5,020,619 | 6/1991 | Kanazawa et al. | 180/140 |
| 5,054,568 | 10/1991 | Shiraishi et al. | 180/140 |
| 5,107,430 | 4/1992 | Magnino | 364/426.03 |
| 5,301,768 | 4/1994 | Ishikawa et al. | 180/249 |
| 5,328,255 | 7/1994 | Isella | 303/100 |
| 5,333,058 | 7/1994 | Shiraishi et al. | 364/424.05 |
| 5,341,297 | 8/1994 | Zomotor et al. | 364/426.03 |
| 5,345,385 | 9/1994 | Zomotor et al. | 364/424.05 |

FOREIGN PATENT DOCUMENTS

| | | |
|---|---|---|
| 0392165 | 10/1990 | European Pat. Off. |
| 3608420 | 9/1986 | Germany |
| 3611822 | 10/1986 | Germany |
| 3625392 | 8/1987 | Germany |
| 3817546 | 12/1989 | Germany |
| 3919347 | 2/1990 | Germany |
| 4010332 | 10/1990 | Germany |
| WO88/00542 | 1/1988 | WIPO |
| WO89/02842 | 4/1989 | WIPO |
| WO91/04891 | 4/1991 | WIPO |

*Primary Examiner*—Michael Zanelli
*Assistant Examiner*—Susan Wieland
*Attorney, Agent, or Firm*—Evenson, McKeown, Edwards & Lenahan

[57] ABSTRACT

A method and apparatus for preventing vehicle handling instabilities, in which a vehicle yaw angular velocity required value ($\mu_{soll}$) is formed from measured quantities (vehicle velocity, steering wheel angle). The vehicle yaw angular velocity actual value ($\mu_{ist}$) is formed from at least one sensor signal, the difference between the yaw angular velocity required value ($\mu_{soll}$) and the yaw angular velocity actual value ($\mu_{ist}$) is determined by subtracting the yaw angular velocity actual value ($\mu_{ist}$) from the yaw angular velocity required value ($\mu_{soll}$), and the handling situation or the vehicle yaw behavior to be detected is determined from this difference. The time derivative of the difference is formed to determine whether the vehicle exhibits understeer or oversteer. The slip threshold value ($\sigma_{soll}$) is varied in the direction of the value 0 when it is deduced from the detected handling situation that a changed lateral guidance force is required on the wheels of the vehicle driven axle.

14 Claims, 3 Drawing Sheets

METHOD AND APPARATUS FOR PREVENTING VEHICLE HANDLING INSTABILITIES

CROSS-REFERENCE TO RELATED APPLICATIONS

This application is related to U.S. Pat. No. 5,341,297 issued on Aug. 23, 1994 in the name of Adam Zomotor, et al. for APPARATUS AND METHOD FOR PREVENTING INSTABILITIES IN VEHICLE HANDLING and U.S. Pat. No. 5,345,385 issued on Sep. 6, 1994 in the name of Adam Zomotor, et al. for METHOD FOR DETECTING DRIVING SITUATION WITH RESPECT TO VEHICLE YAW BEHAVIOR, respectively.

BACKGROUND AND SUMMARY OF THE INVENTION

The present invention concerns a method and apparatus for preventing vehicle handling instabilities, in which a vehicle yaw angular velocity required value ($\mu_{soll}$) is formed from measured quantities (vehicle speed, steering wheel angle) in a computer unit supplied with at least one sensor signal from which the actual value of the vehicle yaw angular velocity ($\mu_{ist}$) is formed. The difference between the yaw angular velocity required value ($\mu_{soll}$) and the yaw angular velocity actual value ($\mu_{ist}$) is formed in the computer unit by subtracting the yaw angular velocity actual value ($\mu_{ist}$) from the yaw angular velocity required value ($\mu_{soll}$), and at least one output signal formed in the computer unit from this difference and is output from the computer unit as representing the detected handling situation or the yaw behavior of the vehicle.

A method of preventing vehicle handling instabilities is described in DE 36 25 392 A1 in which, in order to detect the handling situation or the yaw behavior of the vehicle, the vehicle yaw angular velocity ($\mu_{ist}$) is measured by, for example, a fiber optics gyroscope. An alternative possibility for determining the yaw angular velocity actual value ($\mu_{ist}$) is provided by deriving the yaw angular velocity ($\mu_{ist}$), with the use of at least one acceleration sensor which measures the radial acceleration of the vehicle. In addition, a yaw angular velocity required value ($\mu_{soll}$) is derived from the measured velocity of the vehicle in the longitudinal direction and the measured steering angle. A critical handling situation is then deduced when the yaw angular velocity actual value ($\mu_{ist}$) deviates from the yaw angular velocity required value ($\mu_{soll}$), i.e. when the actual behavior of the vehicle deviates from the required behavior of the vehicle. This detected deviation of the actual behavior from the required behavior of the vehicle is then used to minimize the deviation by braking or accelerating individual wheels of the vehicle in such a way that the deviation is minimized.

DE 39 19 347 A1 describes a comparison between a desired yaw rate and the actual value of the yaw rate of a vehicle in order to influence the steering behavior of the vehicle by an appropriate action on the brakes. In this arrangement, the braking force on the wheels at the inside of the curve or on the wheels at the outside of the curve is influenced.

DE 38 17 546 A1 describes varying (i.e. increasing or reducing) the brake pressure on the wheels of a vehicle in pulses for a short period in order to deduce from the resulting transverse accelerations how far the corresponding wheel is removed from the stability limit. Slip thresholds are then correspondingly varied as a function of the distance from the stability limit. The distance from the stability limit is determined from the transverse accelerations since these transverse accelerations characterize the slope of the friction/slip curve. Conclusions on the distance from the stability limit can then be drawn from the order of magnitude of this slope because it becomes increasingly flatter as the distance from the stability limit becomes less.

A so-called linear single-track model of a vehicle is also known (DE-Buch: Zomotor, Adam; Fahrwerktechnik: Fahrverhalten; Herausgeber: Jörnsen Reimpell; Würzburg: Vogel, 1987; First Edition; ISBN 3-8023-0774-7, in particular pages 99–127) by means of which, for example, a yaw angular velocity ($\mu_{ist}$) of the vehicle occurring under certain conditions can be determined from measured values of the vehicle velocity in the vehicle longitudinal direction and the steering wheel angle or the steering angles of the wheels corresponding thereto. On the basis of this model, this yaw angular velocity ($\mu_{ist}$) is then used as the yaw angular velocity required value ($\mu_{soll}$).

An object of the present invention is to provide an apparatus and method for preventing vehicle handling instabilities in such a way that handling instabilities are, as far as possible, prevented before they occur.

This object has been achieved in accordance with the present invention by forming the time derivative of the difference in a computer unit with an output signal being generated in the computer unit as a function of this derivative with respect to time. The output signal contains information on whether the vehicle exhibits understeer or oversteer. The slip threshold value ($\sigma_{soll}$) is varied in the direction of the value 0 in a computer device on the basis of the analysis of the output signal, i.e. is reduced in the case of drive slip and is increased when an engine braking torque occurs, if it is deduced from the analysis of the output signal that a changed lateral guidance force is required on the wheels of the drive axle of the vehicle. In vehicles with driven rear wheels a requirement for a changed lateral guidance force is deduced, for both oversteer and understeer in the case of drive slip and for oversteer when an engine braking torque occurs. In vehicles with driven front wheels a requirement for a changed lateral guidance force is deduced, for both oversteer and understeer in the case of drive slip and for understeer when an engine braking torque occurs.

One advantage of the present invention resides in the fact that, due to the early detection of the handling situation or of the yaw behavior of the vehicle, unstable handling conditions can be recognized even at an early stage. It is therefore possible to prevent the possible occurrence of unstable handling conditions even at an early stage by adapting the slip threshold values.

The vehicle longitudinal velocity and the steering wheel angle or the steering angles of the wheels are recorded by way of appropriate sensors. These sensor signals can then be supplied to a computer unit in which, from these parameters, a vehicle yaw angular velocity ($\mu_{soll}$) desired by the driver can be determined as the yaw angular velocity required value ($\mu_{soll}$) in accordance, for example, with the aforementioned linear single-track model. The handling situation or the yaw behavior is then detected in the computer unit by comparing the yaw angular velocity actual value $\mu_{ist}$ with the required value $\mu_{soll}$ which has been determined.

It is not only the magnitude of the difference between the yaw angular velocity actual value ($\mu_{ist}$) and the required value ($\mu_{soll}$) which is considered but also the sign of this difference and the time derivative of this difference. Particularly early recognition of the possible occurrence of critical handling situations is possible by taking account of, in particular, the derivative with respect to time so that the occurrence of critical handling situations can then be prevented at this point by appropriate variations of the slip threshold values.

The slip threshold value in the drive slip control system is varied as a function of the handling situation or vehicle yaw behavior detected. If a requirement for a larger lateral guidance force at the driving wheels is then deduced from the yaw behavior of the vehicle, the slip threshold values are correspondingly reduced.

The slip is calculated by subtracting the wheel rotational speed corresponding to the instantaneous vehicle speed from the measured wheel rotational speed. In this case, the slip is given in the physical units of the rotational speed. The difference determined in this way can, however, also be referred to the measured wheel rotational speed or to the wheel rotational speed corresponding to the instantaneous vehicle speed. In the latter case, the slip appears as a relative quantity which can, for example, be given as a percentage (%).

Instead of determining the yaw angular velocity required value ($\mu_{soll}$) by way of the aforementioned linear single-track model, it is also possible to determine this required value from a previously determined characteristic diagram, i.e. a diagram determined on one occasion.

BRIEF DESCRIPTION OF THE DRAWINGS

These and other objects, features and advantages of the present invention will become more apparent from the following description of a currently preferred embodiment when taken in conjunction with the accompanying drawings wherein.

DETAILED DESCRIPTION OF THE DRAWINGS

Figure 1:
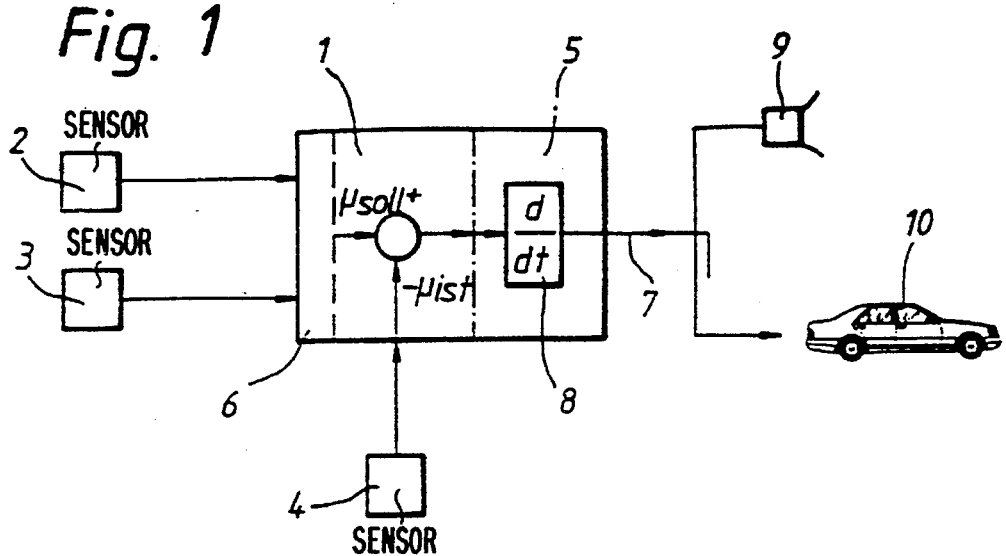
FIG. 1 is a schematic diagram of the sensors and the computer unit used in the present invention.

As seen in FIG. 1, the signal from a sensor 2 representing vehicle speed is supplied to the computer unit 1. The sensor 2 can, for example, be a rotational speed sensor such as is used in the known anti-lock brake systems (ABS). It is also possible for the sensor 2 to correspond to several rotational speed sensors of different wheels in which the signals of the several sensors are averaged. A signal representing the steering wheel angle is supplied to the computer unit 1 via a sensor 3 which can, therefore, be a direct steering wheel angle sensor. Alternatively, this sensor 3 can also be a sensor which records the steering angle of one of the wheels of the vehicle 10 or an average of the steering angles of the wheels of the vehicle 10. In addition, the computer unit 1 is supplied with the signal of at least one further sensor 4 by which the yaw angular velocity actual value ($\mu_{ist}$) can be formed in the computer unit. This sensor 4 can, for example, measure the yaw angular velocity ($\mu_{ist}$) directly.

In one part 6 of the computer unit 1, a yaw angular velocity required value ($\mu_{soll}$) is determined from the signals of the sensors 2 and 3 by, for example, of the linear single-track model. This yaw angular velocity required value ($\mu_{soll}$) is compared with the yaw angular velocity actual value ($\mu_{ist}$) formed such that the difference between the required value and the actual value is formed. The handling situation or the yaw behavior of the vehicle 10 is then detected in another part 5 of the computer unit 1 using the derivative 8 with respect to time of the difference. An output signal 7, which represents the handling situation detected, is thereby generated.

Figure 2:
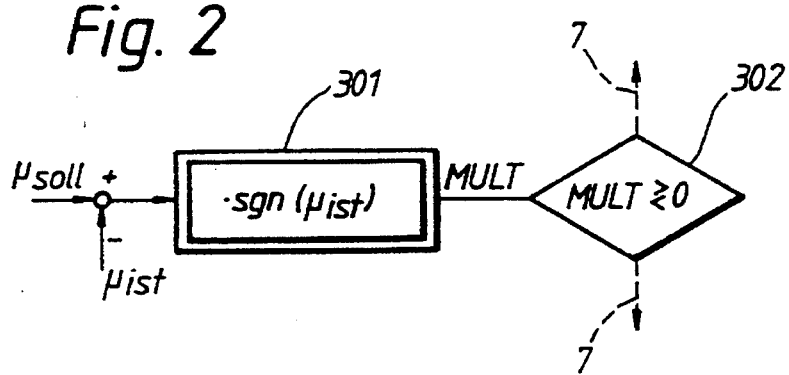
FIG. 2 is a schematic diagram of the first part of a flow diagram from which the vehicle handling situation is detected in the present invention.

As seen in FIG. 2, detection of the handling condition can also take place in the computer unit 1 by analyzing the difference between the yaw angular velocity actual value ($\mu_{ist}$) and the required value ($\mu_{soll}$) such that a conclusion can be drawn on whether understeering or oversteering is present. For this purpose, the difference is formed by subtracting the yaw angular velocity actual value ($\mu_{ist}$) from the yaw angular velocity required value ($\mu_{soll}$). This difference is multiplied in the computer unit 1 by the sign of the yaw angular velocity actual value ($\mu_{ist}$) 301 and this produces a result (MULT). It is possible to deduce understeer or oversteer from this result (MULT) 302. If this quantity (MULT) is positive, the magnitude of the yaw angular velocity required value ($\mu_{soll}$) is greater than the magnitude of the yaw angular velocity actual value ($\mu_{ist}$) but the sign of the required value ($\mu_{soll}$) and the actual value ($\mu_{ist}$) are the same. In this case, the vehicle 10 is slipping at the front axle. This behavior, where the vehicle is unwilling to yaw, is referred to as understeering. If the quantity MULT is negative, the yaw angular velocity actual value ($\mu_{ist}$) is larger than the required value ($\mu_{soll}$) or, alternatively, the yaw angular velocity actual value ($\mu_{ist}$) and the required value ($\mu_{soll}$) have different signs. This behavior, in which the vehicle 10 has a larger yaw angular velocity ($\mu_{ist}$) than the driver expects, is referred to as oversteering. An output signal 7 can, for example, be formed by taking account of the quantity (MULT), in addition to the time derivative 8, in the generation of the output signal 7 by, for example, generating an additional output signal 7 only as a function of the result quantity (MULT).

Figure 3:
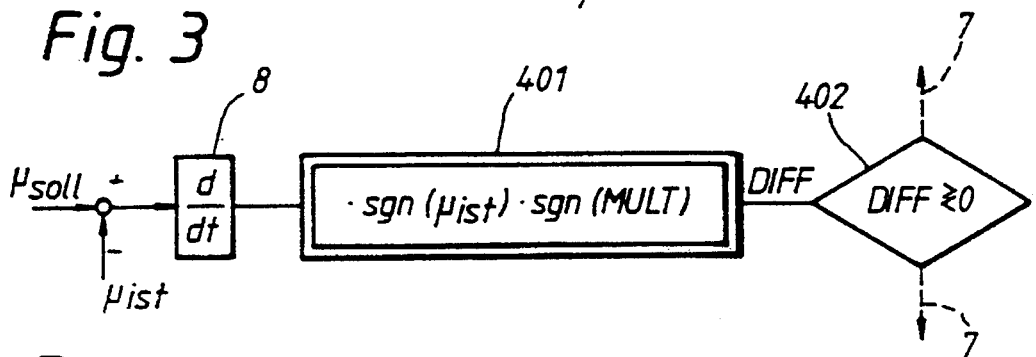
FIG. 3 is a schematic diagram of the second part of the flow diagram referred to above from which the vehicle handling situation is detected.

Also, a quantity (DIFF) is determined as shown in FIG. 3 by multiplying the time derivative 8 of the difference by the sign of the yaw angular velocity actual value ($\mu_{ist}$) and by the sign of the result quantity (MULT). This quantity (DIFF) has a positive value both in understeering and oversteering when an increase in instability occurs, i.e. when the tendency to oversteer or understeer becomes stronger. The quantity (DIFF) correspondingly takes a negative value when the tendency to understeer or oversteer becomes weaker. By interrogating the quantity (DIFF), it is, therefore, possible to recognize an increase or reduction in instability.

Figure 4:
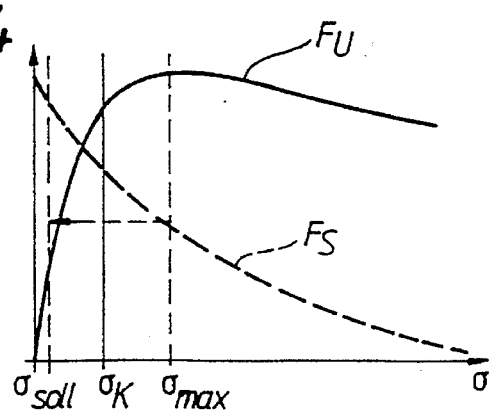
FIG. 4 is a graph of the lateral guidance force $F_S$ and the force $F_U$ in the longitudinal direction of the wheel.

FIG. 4 shows the force ($F_U$) which acts in the longitudinal direction of the wheel and the lateral guidance force ($F_S$) plotted against the slip σ. The point $\sigma_{max}$ indicates the point at which the maximum force can be transmitted in the longitudinal direction of the wheel. At this point, however, the associated lateral guidance force $F_S$ has already fallen relatively sharply. For this reason, the threshold value of the slip is specified at a fixed value ($\sigma_K$) in known systems; this is a compromise because at this value ($\sigma_K$), the force $F_U$ is less than it is at the point ($\sigma_{max}$) but the lateral guidance force $F_S$ at this point ($\sigma_K$) is greater than it is at the point $\sigma_{max}$. In accordance with the present invention, a variation of the slip threshold value ($\sigma_{soll}$) starting from the slip threshold value ($\sigma_{max}$) takes place as a function of the detected handling condition as described below.

Figure 5:
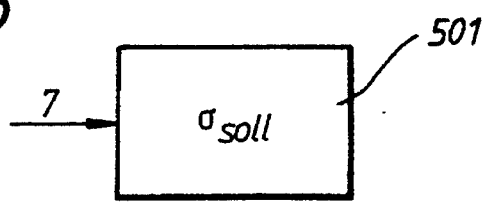
FIG. 5 is a schematic diagram of a computer device by way of which the method according to the present invention can be carried out.

FIG. 5 shows a computer device 501 to which is supplied the output signal 7 of the computer unit 1 (see FIG. 1). The output signal 7 represents the detected handling condition or the yaw behavior of the vehicle. The variation of the slip threshold value ($\sigma_{soll}$) is carried out in the computer unit 501 as a function of the output signal 7. If, from the detected handling condition represented by the output signal 7 of the computer unit 1, it is deduced that increased lateral guidance is required on the wheels of the driving axle of the vehicle 10, the slip threshold value ($\sigma_{soll}$) is moved in the direction of the value 0. In order to carry out an adaptation of the slip threshold value ($\sigma_{soll}$) as a function of the yaw behavior of the vehicle 10 in a manner which is as near optimum as possible, it is advantageous to take account of the change with time of the yaw behavior of the vehicle in the adaptation of the slip threshold value ($\sigma_{soll}$) by deducing from this change with time whether there is an increase in instability or a decrease in instability. If there is an increase in instability, the magnitude of the slip threshold value ($\sigma_{soll}$) is correspondingly varied more strongly.

Figure 6:
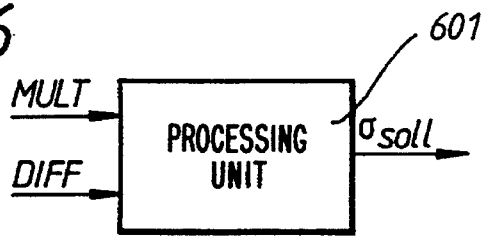
FIG. 6 is a schematic diagram of a processing unit by way of which the method according to the invention can be carried out.

In accordance with the illustrative example of FIG. 6, the slip threshold value ($\sigma_{soll}$) can be varied by supplying the quantities (MULT) and (DIFF), determined in accordance with FIGS. 2 and 3, to a processing unit 601. In the case where drive slip is present, the slip threshold value ($\sigma_{soll}$) can be determined and then output in the processing unit 601 in accordance with the equation:

$$\sigma_{soll} = \sigma_{max} - K_{PV} * K_{P\beta} * abs(MULT) - K_{DV} * K_{D\beta} * DIFF$$

When the foregoing equation is used, the slip threshold value ($\sigma_{soll}$) is reduced in the event of a deviation of the yaw behavior ($\mu_{ist}$) from the required behavior ($\mu_{soll}$) irrespective of the sign of this deviation and account is taken of the increase or reduction in instability. It is then advantageous to specify a slip threshold value of 0 as the lower limiting value for the slip threshold value $\sigma_{soll}$). Depending on the deviation of the yaw behavior ($\mu_{ist}$) from the required behavior ($\mu_{soll}$), it is then also possible to permit a slip threshold value smaller than 0, i.e. to permit an engine braking torque at the drive axle, as is further explained below with reference to FIG. 9. The value ($\sigma_{max}$) can then advantageously vary with the friction coefficient β. As an example, the value ($\sigma_{max}$) can be 6% for the value β=1 and can be 3% for the value β=0.3. This takes account of the fact that at low friction coefficients β, the maximum of the peripheral force $F_U$ is displaced to lower values of σ.

Figure 7:
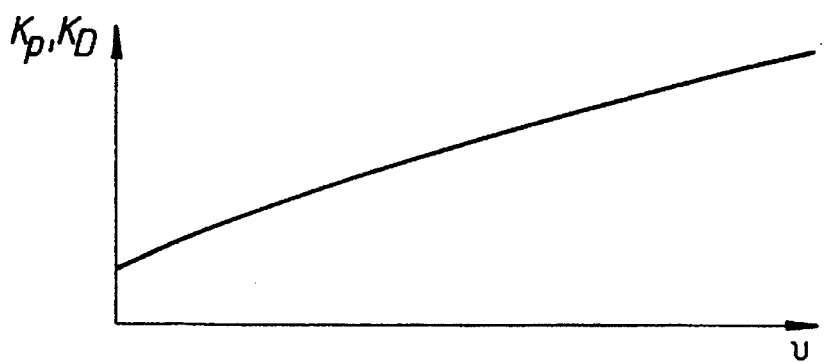
FIG. 7 is a graph showing the change in the variation of the slip threshold value with the vehicle speed $\underline{v}$.

FIG. 7 shows that the factors $K_{PV}$ and $K_{DV}$ are not constant but advantageously increase with increasing vehicle speed v in the present invention. With increasing vehicle speed v, the transverse acceleration level increases at constant yaw angular velocity ($\mu_{ist}$). Consequently, a certain yaw angular velocity ($\mu_{ist}$) can be completely uncritical at low vehicle speeds v whereas this yaw angular velocity ($\mu_{ist}$) is critical at high vehicle speeds v. This is because the transverse acceleration increases in proportion to the vehicle speed v in the case of steady travel round a curve. With increasing vehicle speed v, deviations between the required value ($\mu_{soll}$) and the actual value ($\mu_{ist}$) of the yaw angular velocity become more and more indicative of instability. As is shown in FIG. 7, this increase can take place almost linearly. Orders of magnitude for the quantity $K_{PV}$ are then 0.1%/(1°/s) at a vehicle speed of v=0 and 1%/(1°/s) at a vehicle speed of v=100 km/h. The quantity $K_{DV}$ can take the value 0.01%/(1°/s$^2$) at a vehicle speed of v=0 and the value 0.1%/(1°/s$^2$) at a vehicle speed of v=100 km/h. Taking account of the vehicle speed v in this way causes an increasing reduction of the slip threshold value ($\sigma_{soll}$) with increasing vehicle speeds. This makes allowance for the fact that unstable handling conditions are favored by increasing vehicle speeds.

Figure 8:
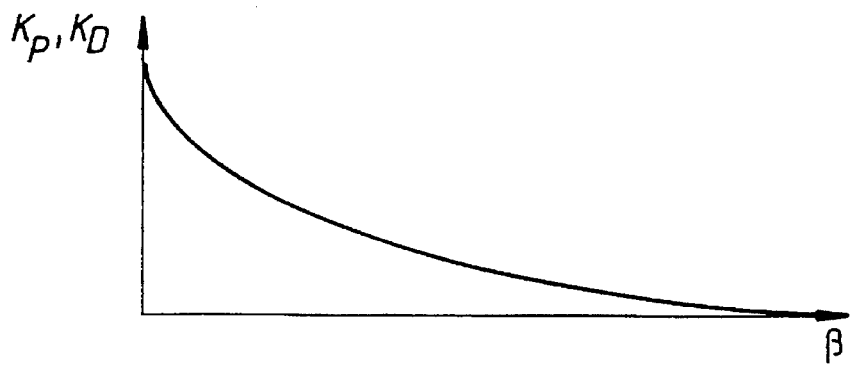
FIG. 8 is a graph showing the change in the variation of the slip threshold value with the friction coefficient $\beta$.

It may be seen from FIG. 8 that, in an embodiment of the present invention, the factors $K_{P\beta}$ and $K_{D\beta}$ can also be varied with the friction coefficient β. This variation is then such that the factors $K_{P\beta3}$ and $K_{D\beta}$ decrease with increasing friction coefficient β, a more pronounced decrease in the factors $K_{P\beta}$ and $K_{D\beta}$ taking place in the range of lower friction coefficient β than in the range of larger friction coefficient β. Orders of magnitude for the value $K_{P\beta}$ are then 1 for the friction coefficient β=1 and 2 for the friction coefficient β=0.3. At the friction coefficient β=1, the parameter $K_{D\beta}$ can take the value 1 and it can take the value 2 at the friction coefficient β=0.3. Taking account of the friction coefficient β in this way causes a smaller reduction of the slip threshold value ($\sigma_{soll}$) with increasing friction coefficients. This takes account of the fact that unstable handling conditions can be favored or fostered by decreasing coefficients of friction.

Figure 9:
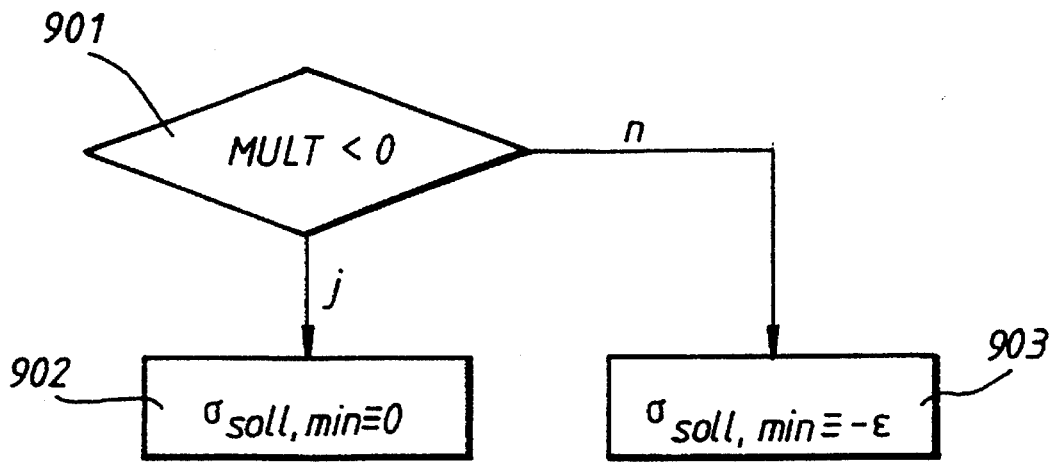
FIG. 9 is a flow chart of the limitation of the variation of the slip threshold value ($\sigma_{soll}$) in a situation where drive slip is present.

As in FIG. 9, oversteering or understeering is determined by analyzing the quantity (MULT) in the step 901 such that the step 901 checks whether the quantity (MULT) is smaller than 0 (oversteering) or is greater than zero (understeering). Oversteering means that the lateral guidance force at the rear wheels is too small relative to the lateral guidance force at the front wheels. In order to permit an increase in the lateral guidance force at the rear wheels in a vehicle with driven rear wheels when drive slip is present, a slip threshold value ($\sigma_{soll}$) of value 0 is specified as the lower limiting value ($\sigma_{soll,min}$) in the step 902 in this situation (MUL<0). Correspondingly, understeering means that the lateral guidance force at the rear wheels is too large relative to the lateral guidance force at the front wheels.

In order to permit a reduction of the lateral guidance force at the rear wheels in a vehicle with driven rear wheels when drive slip is present, a value −ε is specified as the lower limiting value ($\sigma_{soll,min}$) of the slip threshold value ($\sigma_{soll}$) in the step 903 in this case (MULT>0); ε is greater than 0 so that the quantity −ε is less than zero. In a calculation of the slip in terms of a percentage (%), this lower limiting value ($\sigma_{soll,min}$) at the slip threshold value ($\sigma_{soll}$) can be of the order of magnitude of approximately −3%. FIG. 9 shows the specification of the lower limiting value ($\sigma_{soll,min}$) of the slip threshold value ($\sigma_{soll}$) for a vehicle with rear wheel drive. In the case of a vehicle with front wheel drive, it is necessary precisely to reverse the variation of the lower limiting value ($\sigma_{soll,min}$) of the slip threshold value ($\sigma_{soll}$) which can be achieved by checking, in the step 901, whether the quantity MULT is greater than 0. The yes/no outputs of this block then remain unaltered.

Figure 10:
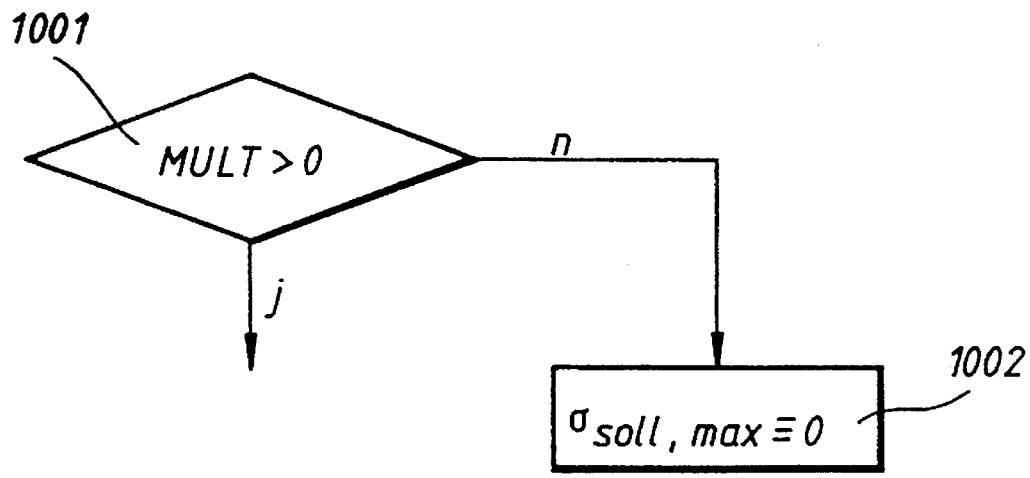
FIG. 10 is a flow chart similar to FIG. 9 but showing the limitation of the variation of the slip threshold value ($\sigma_{soll}$) in the situation where an engine braking torque is present.

By analogy with the relationships shown, variation of the slip threshold value ($\sigma_{soll}$) can also take place in the case of engine braking torque control (as shown in FIG. 10) by specifying an upper limiting value ($\sigma_{soll,max}$) of the slip threshold value ($\sigma_{soll}$). FIG. 10 is limited to a representation of the relationships in the case of a vehicle with rear wheel drive. In the case of a vehicle with front wheel drive, it is only necessary to change the procedure by checking whether the quantity (MULT) is smaller than zero, with the yes/no outputs of the block 1001 then remaining unaltered. In the case of vehicles with rear axle drive, larger negative brake slip can be permitted in the case of understeer (MULT>0) corresponding to 1001; i.e. for engine braking torque control, there is no variation of the slip threshold value ($\sigma_{soll}$) in the case of understeering. For oversteer (MULT<0) corresponding to 1001, the upper limiting value ($\sigma_{soll,max}$) of the slip threshold value ($\sigma_{soll}$) has to be specified as the value 0 corresponding to 1002. A larger negative brake slip is permitted as the upper limiting value ($\sigma_{soll,max}$) of the threshold value ($\sigma_{soll}$) in the case of oversteering in vehicles with front wheel drive; i.e. there is no variation of the slip threshold value ($\sigma_{soll}$) in the case of oversteering when engine braking torque control is used. In the case of understeering, the upper limiting value ($\sigma_{soll,max}$) is then specified as the value 0. For engine braking torque control, the equation given above for determining the variation of the slip threshold value $\sigma_{soll}$ is subject to the following change:

$$\sigma_{soll} = \sigma_{max} + K_{PV} * K_{P\beta} * abs(MULT) + K_{DV} * K_{D\beta} * DIFF$$

This means that in the cases quoted in which the upper limiting value ($\sigma_{soll,max}$) of the slip threshold value ($\sigma_{soll}$) is specified as the value 0, the slip threshold value is varied, corresponding to the deviation of the yaw behavior ($\mu_{ist}$) from the required value ($\mu_{soll}$) in the direction of larger slip, i.e. in the direction of 0.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method of preventing handling instabilities in a motor vehicle, comprising the steps of (a) forming a vehicle yaw angular velocity required value from measured quantities in a means for computing, (b) supplying the computing means with at least one sensor signal from which an actual value of vehicle yaw angular velocity is formed, (c) forming a difference between the yaw angular velocity required value and the yaw angular velocity actual value in the computing means by subtracting the yaw angular velocity actual value from the yaw angular velocity required value, (d) forming a time derivative of the difference in the computing means, (e) forming at least one output signal in the computing means from the difference and as a function of the time derivative to represent one of a detected handling situation and the yaw behavior of the motor vehicle and to contain information on vehicle understeering and oversteering, (f) wherein, based upon a determination of at least one of oversteering and understeering in steps (a)–(e) above, in vehicles with driven rear wheels, the required changed lateral guidance force is deduced, for both oversteering and understeering, when drive slip occurs and, for oversteering when an engine braking torque occurs, and, in vehicles with driven front wheels, the required changed lateral guidance force is deduced, for both oversteering and understeering, when drive slip occurs and, for understeering, when an engine braking torque occurs, such that the motor vehicle is handled with minimum instability by selectively braking and accelerating individual wheels, and (g) varying a slip threshold value in a direction toward zero in the computing means when an analysis of the at least one output signal deduces that a changed lateral guidance force is required on drive axle wheels of the motor vehicle, such that control systems of the motor vehicle are operative to reduce said threshold value when drive slip occurs and increase said threshold value when an engine braking torque occurs.

2. The method according to claim 1, wherein, for the vehicles with driven rear wheels, a lower limiting value is specified during a variation of the slip threshold value in the case of oversteering with drive slip and an upper limiting value is specified in the case of oversteering when an engine braking torque occurs, the slip threshold value being, respectively, not less than and not exceeding the lower and upper limiting values for vehicles with driven rear wheels, a second lower limiting value is specified during a variation of the slip threshold value in the case of understeering with drive slip, the slip threshold value being not less than the second limiting value and the value of the second limiting value being less than zero, for vehicles with driven front wheels, a third lower limiting value is specified during a variation of the slip threshold value in the case of oversteering with drive slip, the slip threshold value being not less than the third limiting value and the value of the third limiting value being less than 0, and for vehicles with driven front wheels, a fourth lower limiting value is specified during a variation of the slip threshold value in the case of understeering with drive slip and a second upper limiting value is specified when an engine braking torque occurs, the slip threshold value being not less than or not exceeding the fourth lower and second upper limiting values respectively.

3. The method according to claim 2, wherein a quantity is determined in the computing means by multiplying the difference by the sign of the yaw angular velocity, an output signal representing understeering of the vehicle is generated when the quantity is smaller than zero, the output signal generated is representative of oversteering of the motor vehicle when the quantity is greater than zero, a second quantity is determined in the computing means by multiplying the derivative with respect to time of the difference by the sign of the yaw angular velocity and by the sign of the first quantity, the generated output signal is representative of an increase in instability when the second quantity is greater than zero, and the generated output signal is representative of a decrease in instability when the second quantity is smaller than zero.

4. The method according to claim 3, wherein the variation of the slip threshold value is proportional to the absolute value of the first quantity and to the second quantity.

5. The method according to claim 4, wherein constants of proportionality depend on the yaw angular velocity such that magnitudes of the constants of proportionality increase with increasing speed.

6. The method according to claim 5, wherein the constants of proportionality depend on friction coefficient such that the magnitudes of the constants of proportionality increase with a decreasing friction coefficient.

7. The method according to claim 6, wherein a greater rate of increase in the magnitude of the constants of proportionality occurs with decreasing friction coefficient.

8. An apparatus for preventing handling instabilities in a motor vehicle, comprising
   (a) computer means for forming a vehicle yaw angular velocity required value from measured quantities,
   (b) means for supplying the computer means with at least one sensor signal from which an actual value of vehicle yaw angular velocity is formed, said computer means forming a difference between the yaw angular velocity required value and the yaw angular velocity actual value by subtracting the yaw angular velocity actual value from the yaw angular velocity required value and to form a time derivative of the difference, said computer means forming at least one output signal from the difference and as a function of the time derivative to represent a detected handling situation and the yaw behavior of the motor vehicle and to contain information on vehicle understeering and oversteering,
   (c) means operatively associated with said computing means for varying a slip threshold value in a direction toward zero when an analysis of the at least one output signal deduces that a changed lateral guidance force is required on drive axle wheels of the motor vehicle, such that said slip threshold value is reduced when drive slip occurs and is increased when an engine braking torque occurs, and
   (d) means for changing the lateral guidance force in response to the at least one output signal in a motor vehicle with driven rear wheels if the required changed lateral guidance force is deduced, for both oversteering and understeering when drive slip occurs and for oversteering when an engine braking torque occurs, and for changing the lateral guidance force in a motor vehicle with driven front wheels if the required changed lateral guidance force is deduced, for both oversteering and understeering when drive slip occurs and for understeering when an engine braking torque occurs.

9. The apparatus according to claim 8, wherein for the vehicles with driven rear wheels, a lower limiting value is specified during a variation of the slip threshold value in the case of oversteering with drive slip and an upper limiting value is specified in the case of oversteering when an engine braking torque occurs, the slip threshold value being, respectively, not less than and not exceeding the lower and upper limiting values for the vehicles with driven rear wheels, a second lower limiting value is specified during a variation of the slip threshold value in the case of understeering with drive slip, the slip threshold value being not less than the second limiting value and the value of the second limiting value being less than zero, for vehicles with driven front wheels, a third lower limiting value is specified during a variation of the slip threshold value in the case of oversteering with drive slip, the slip threshold value being not less than the third limiting value and the value of the third limiting value being less than 0, and for vehicles with driven front wheels, a fourth lower limiting value is specified during a variation of the slip threshold value in the case of understeering with drive slip and a second upper limiting value is specified when an engine braking torque occurs, the slip threshold value being not less than or not exceeding the fourth lower and second upper limiting values respectively.

10. The apparatus according to claim 9, wherein a quantity is determined in the computer means by multiplying the difference by the sign of the yaw angular velocity, an output signal representing understeering of the vehicle is generated when the quantity is smaller than zero, the output signal generated is representative of oversteering of the vehicle when the quantity is greater than zero, a second quantity is determined in the computer means by multiplying the derivative with respect to time of the difference by the sign of the yaw angular velocity and by the sign of the first quantity, the generated output signal is representative of an increase in instability when the second quantity is greater than zero, and the generated output signal is representative of a decrease in instability when the second quantity is smaller than zero.

11. The apparatus according to claim 10, wherein the variation of the slip threshold value is proportional to the absolute value of the first quantity and to the second quantity.

12. The apparatus according to claim 11, wherein constants of proportionality depend on the yaw angular velocity such that magnitudes of the constants of proportionality increase with increasing speed.

13. The apparatus according to claim 12, wherein the constants of proportionality depend on friction coefficient such that the magnitudes of the constants of proportionality increase with a decreasing friction coefficient.

14. The apparatus according to claim 13, wherein a greater rate of increase in the magnitude of the constants of proportionality occurs with a decreasing friction coefficient.

* * * * *